United States Patent [19]

van der Lely et al.

[11] Patent Number: 4,465,211
[45] Date of Patent: Aug. 14, 1984

[54] WEIGHT INDICATOR FOR MATERIAL CONTAINER OF AGRICULTURAL DISTRIBUTING DEVICE

[75] Inventors: Ary van der Lely, Maasland; Cornelis J. G. Rom, Rozenburg, both of Netherlands

[73] Assignee: C. van der Lely N.V., Maasland, Netherlands

[21] Appl. No.: 902,414

[22] Filed: May 3, 1978

[30] Foreign Application Priority Data

May 9, 1977 [NL] Netherlands .......................... 7705057

[51] Int. Cl.$^3$ .......................... B67D 5/06; B67D 5/64
[52] U.S. Cl. ..................................... 222/166; 177/112; 177/145; 177/163; 177/245; 222/77; 239/661
[58] Field of Search ....................... 222/43, 44, 58, 77, 222/614, 621, 164, 166; 414/21; 239/71, 661; 177/111, 112, 116, 145, 161, 163, 208, 245

[56] References Cited

U.S. PATENT DOCUMENTS

| | | | |
|---|---|---|---|
| 2,287,829 | 6/1942 | Bryan | 222/77 |
| 2,449,915 | 9/1948 | Stadler | 111/1 |
| 2,766,104 | 10/1956 | Gilmore | 222/58 X |
| 3,017,939 | 1/1962 | Vegors | 177/208 |
| 3,024,930 | 3/1962 | Sims | 414/21 X |
| 3,409,173 | 11/1968 | Ejnarsson | 222/58 |
| 3,425,415 | 2/1969 | Gordon et al. | 222/58 X |
| 3,497,023 | 2/1970 | Ramis | 177/161 X |
| 3,899,138 | 8/1975 | van der Lely et al. | 239/661 |
| 4,093,107 | 6/1978 | Allman et al. | 222/614 X |

*Primary Examiner*—Fred Andrew Silverberg
*Attorney, Agent, or Firm*—Penrose Lucas Albright

[57] ABSTRACT

A container for material such as fertilizer or seeds which delivers same to an underlying distributing device is mounted on a tractor so that the weight of the container and associated equipment is indicated to the operator of the tractor whereby the amount of material remaining in the container is specifically indicated. The weighing apparatus includes a spring, pointer and scale incorporated in the supporting structure extending from the tractor for the container and associated equipment and the pointer and scale may be interconnected to the spring and mounted on the tractor for the convenience of the operator. In one embodiment the spring is a tension spring at the top of the supporting structure and in another embodiment it is a compression spring near the bottom of the supporting structure. Instead of a spring, the weight may be indicated by hydraulic pressure in a hydraulic system for the supporting structure. Such pressure may be used to control a dosing mechanism in the distributing device via a computer to meter a given quantity of material based on the tractor's velocity and the quantity of material to be uniformly spread over a given area of field. The material can be a liquid and mounted on a frame having supporting wheels with information as to the weight of the container being conveyed by a hydraulic piston and cylinder assembly which is situated between the container and the mounting for the wheels.

8 Claims, 14 Drawing Figures

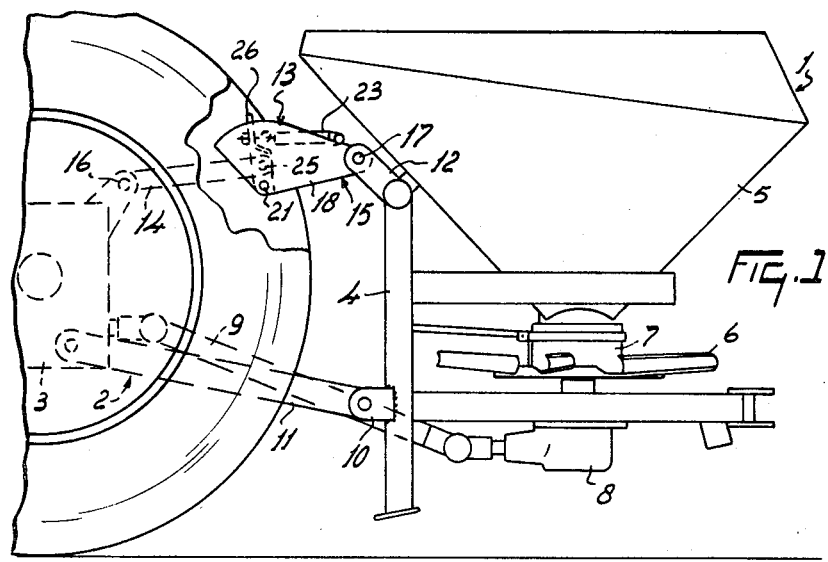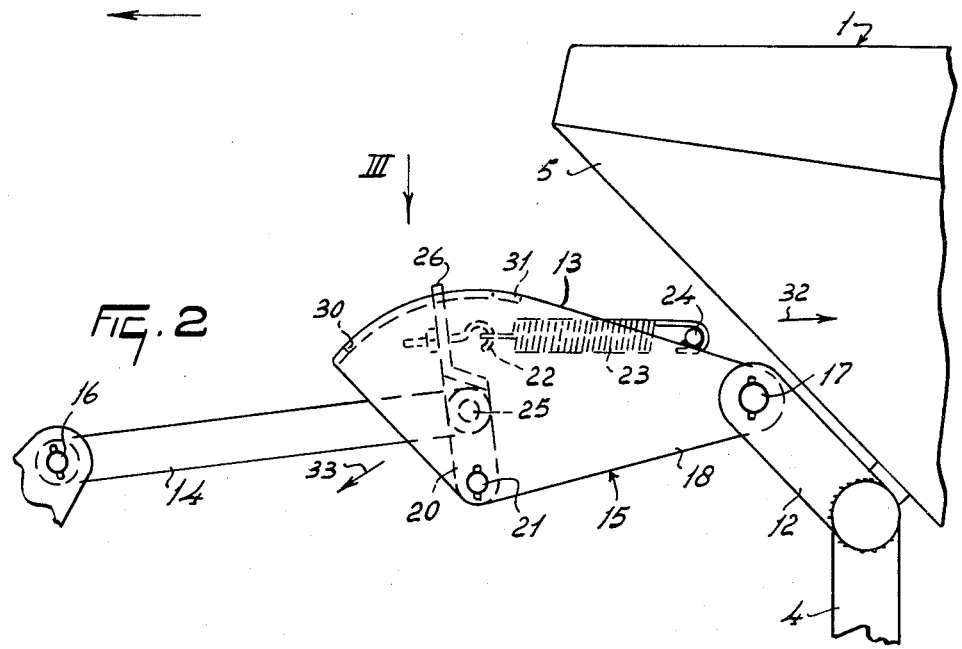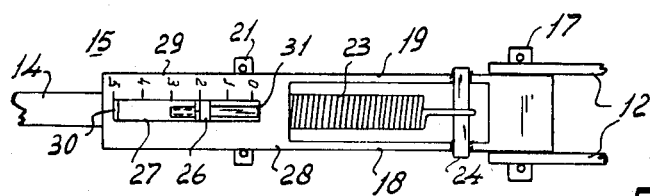

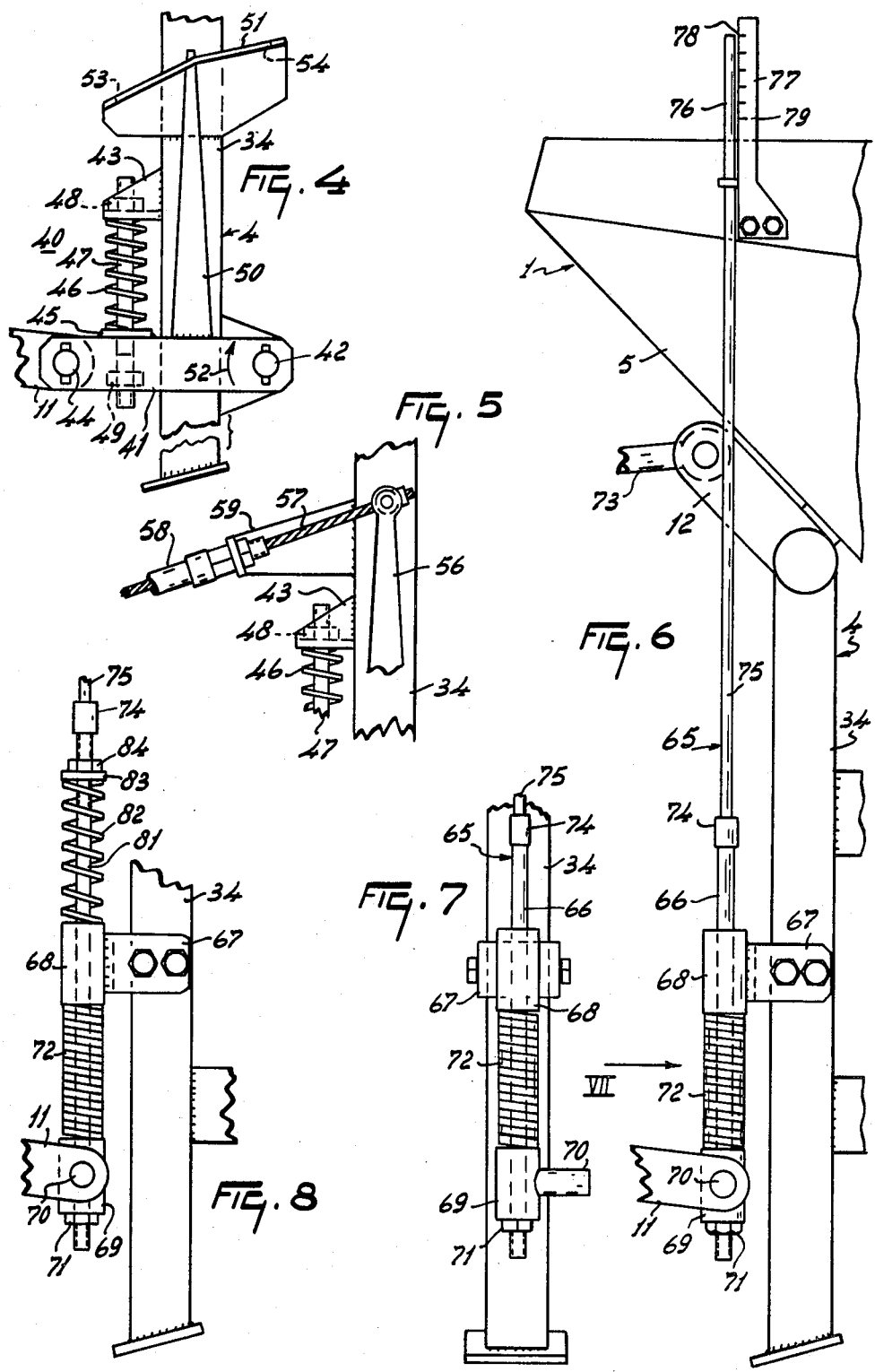

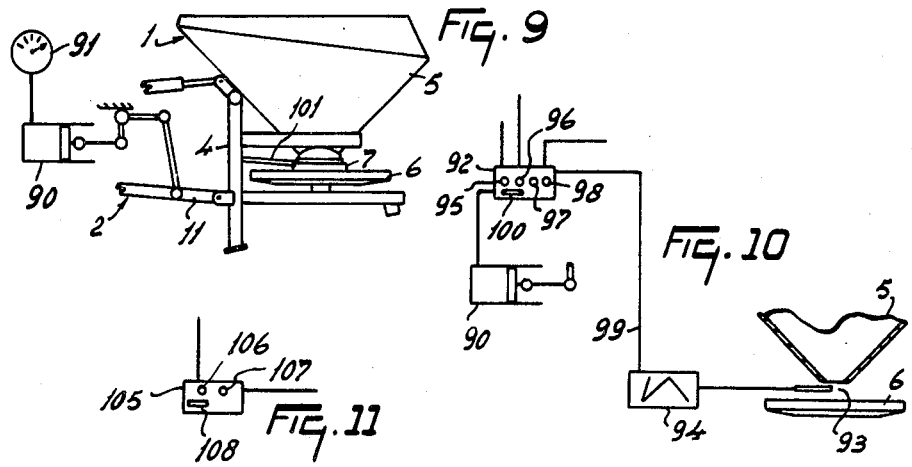
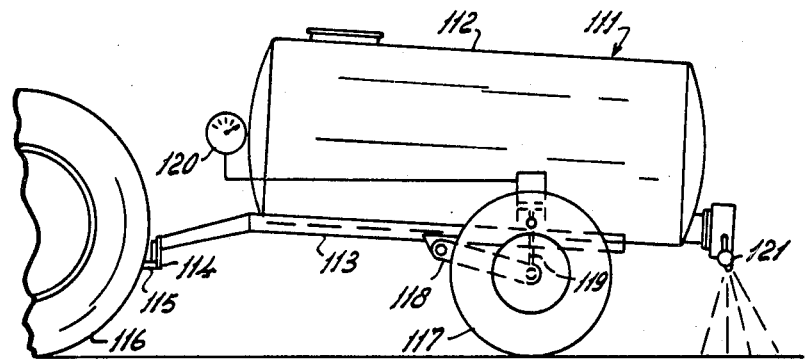
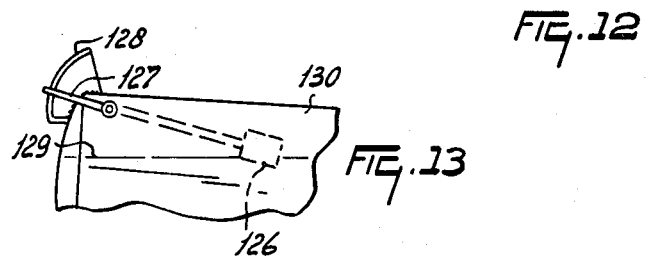
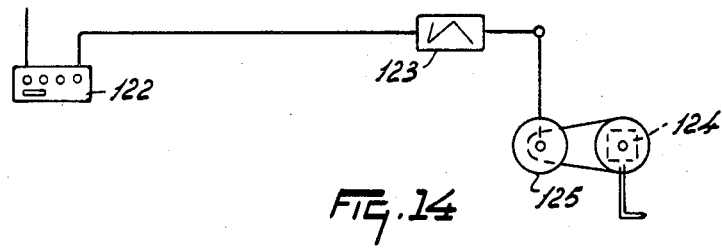

WEIGHT INDICATOR FOR MATERIAL CONTAINER OF AGRICULTURAL DISTRIBUTING DEVICE

This invention relates to equipment for distributing material such as fertilizer or seeds, over or into the ground.

According to one aspect of the present invention there is provided, equipment for distributing material over or into the ground, the equipment comprising means for coupling the equipment to the lifting device of a tractor or like vehicle, the equipment having a container for material to be distributed and a discharge member, to which material is fed in use from the container, the equipment having apparatus providing data related to the quantity of material delivering from the container to the discharge member in use of the equipment, the apparatus is arranged in an upper rod connecting the equipment to the tractor.

According to another aspect of the present invention there is provided equipment for distributing material over or into the ground, the equipment comprising a container for material to be distributed and a discharge member, to which material is fed in use from the container, the equipment having apparatus providing data related to the quantity of material delivering from the container to the discharge member in use of the equipment, the apparatus comprises a measuring instrument which is responsive to the pressure in a fluid contained in the measuring apparatus and acted upon by the weight of the equipment.

The information obtained from the apparatus based on the weight of such equipment during operation is indicative of the flow of material from the container so that it is possible to ascertain whether steps have to be taken to ensure a desired uniformity or density of distribution.

In an advantageous embodiment, the apparatus comprises a measuring instrument for continuously measuring the weight of the device during discharge of the material. The quantity of material in the container will diminish during operation so changing the laden weight of the equipment; information about this diminution provides an indication of the quantity of material distributed per unit time and/or per distance covered. The apparatus may comprise a measuring apparatus including a spring. The reaction of the spring to the weight variation of the equipment may be used to provide an indication of the flow of material out of the container.

Alternatively, the apparatus may be arranged in a lower arm of the lifting means. In for example, large implements, the apparatus may be arranged in accordance with the invention between a ground wheel frame and a frame carrying the container.

The apparatus may be coupled with a computer which processes the information from the apparatus and provides desired parameters. In this way automatic correction of any irregularity of delivery of material can be readily effected when the computer is coupled with a dosing mechanism so that the dosing mechanism may be readjusted to compensate for a variation, for example, of the running speed of the equipment.

For a better understanding of the present invention and to show how it may be carried into effect, reference will now be made, by way of example only, to the accompanying drawings, in which:

BRIEF DESCRIPTION OF THE DRAWINGS

FIG. 1 is a side elevation of a spreader coupled to lifting means of a tractor;

FIG. 2 is an enlarged side elevation of part of the lifting means shown in FIG. 1;

FIG. 3 is a view taken on the line III in FIG. 2;

FIG. 4 shows an alternative construction for part of the lifting means shown in FIG. 1;

FIG. 5 shows an alternative construction for the part shown in FIG. 4;

FIG. 6 is a partial side elevation of a spreading device coupled with lifting means of a tractor by an alternative structure;

FIG. 7 shows on an enlarged scale part of the construction of FIG. 6 as viewed in the direction of the arrow VII in FIG. 6;

FIG. 8 is a side elevation like FIG. 6 of a modified construction;

FIG. 9 is a schematic side elevation of a spreader connected to lifting means of a tractor;

FIG. 10 shows schematically a control arrangement for a dosing mechanism of a spreader;

FIG. 11 shows schematically an indicator by which a surface covered by a spreader is measured;

FIG. 12 shows schematically an indicator for a liquid distributor;

FIG. 13 shows schematically a further embodiment for indicating apparatus for a liquid distributor; and FIG. 14 shows schematically a control arrangement for a dosing device of a liquid distributor.

DESCRIPTION OF THE PREFERRED EMBODIMENTS

The fertilizer spreader 1, shown in FIGS. 1 to 3 is attached to lifting means 2 of a tractor 3. The spreader 1 comprises a frame 4 on which container in the form of a hopper 5 and a spreading member 6 are arranged. Between the hopper 5 and the spreading member 6 there is a dosing mechanism 7. The spreading member 6 is connected to be driven from a gear box, which is coupled by an auxiliary shaft 9 to the power take-off shaft of the tractor 3. Near the front, the frame 4 has supports 10, which are coupled with lower lifting arms 11 on the lifting means 2. At the top, the frame 4 has a support 12, which is coupled with the tractor 3 by means of an upper rod 13 serving as the top arm of the lifting means.

The upper rod 13 includes indicating apparatus 15 for providing an indication of how full the hopper 5 is or of the extent of emptying of the hopper during the distribution of the material through the spreading member. The upper rod 13 has a coupling rod 14, which is connected by a hinge 16 with the tractor. The indicating apparatus 15 is movably arranged on the coupling rod 14, and is pivotally connected by a shaft 17 to the support 12 of the frame 4. The apparatus 15 and the rod 14 constitute two relatively movable portions of the upper rod 13. The indicating apparatus 15 comprises two parallel plates 18 and 19 which are spaced apart by a small distance and are interconnected at the top by a tie member 28. At the lower edges, a shaft 21 extends between the plates 18 and 19 and has pivoted to it a coupling arm 20. To the end of the coupling arm 20 away from the shaft 21 is connected a tensile spring 23 by means of a pin 22. The tensile spring 23 is connected at its other end with a pin 24 extending across the plates 18 and 19. The coupling rod 14 is connected pivotally to the coupling arm 20 by a pin 25 which is located substantially midway between the pin 22 and the shaft 21. The end 26 of the coupling arm 20 constitutes a pointer extending through a slot 27 in the plate 28. The plate 28 is provided on one side of the opening 27 with a scale 29 having, in this embodiment, divisions numbered 0 to 5. The ends 30 and 31 of the opening 27 form terminal stops for the pointer 26.

In use, the hopper is filled with material to be spread, for example, fertilizer or seeds. The dosing mechanism 7 is adjusted in accordance with a desired quantity of material to be spread per unit surface so that the desired quantity of material flows from the hopper to the spreading member per unit time or per unit distance travelled by the spreader or both. In operation the lower arms 11 of the lifting means 2 support the hopper at the desired level above the ground. The weight of the spreader and of the material contained in the hopper 5 then exert a tensile force on the upper rod 13 in the direction of the arrow 32. Under the action of the force 32 the coupling arm 20 tends to turn about the shaft 21 in the direction of the arrow 33. However, this movement is opposed by the tensile spring 23. The spring 23 will establish an equilibrium position of the arm 20 on the shaft 21 which will be a function of the weight of the spreader and of the material in the hopper 5. The heavier the spreader device and the material in the hopper 5, the farther will the spring 23 be extended and the farther; will the arm 20 turn in the direction of the arrow 33 about the shaft 21. The strength of the spring 33 is chosen so that, under the action of the weight of the spreader alone without any material in the hopper 5, the pointer 26 is located at the end 31 of the opening 37, opposite the zero scale division. When the hopper 5 is completely filled, for example, with 500 kgs of material to be spread, the spring 23 is extended under the action of the weight such that the coupling arm 22 turns about the shaft 21 and the pointer 26 arrives at the end 30 of the opening 27, opposite the scale division 5. Intermediate positions of the pointer 26 provide an indication of the extend to which the hopper has been emptied during operation. Thus the quantity spread over a given distance covered can be ascertained. This may be used to correct the dosing mechanism to a greater or lesser extent or to maintain the setting already selected.

FIG. 4 shows an embodiment of an indicating apparatus 40, which is arranged near the fastening region of the spreader to the lower arms of the lifting means. In this embodiment the parts corresponding with those of FIG. 1 are designated by the same reference numerals. When the embodiment shown in FIG. 4 is used, a normal upper rod is arranged between the support 12 of the frame 4 and the tractor, support 12 being fastened to beam 34 of frame 4. In FIG. 4 the support 10 is replaced by a different fastening member for the frame 4 of the device. In this embodiment the lower arm 11 is fastened by a pin 44 to a supporting or coupling arm 41, which is pivotable about a pin 42 secured to a frame beam 34 of the frame 4. The beam 34 is provided with a support 43. The support 43 is located at the front of the beam 34, as is the place where the arm 41 is joined to the lower arm 11. The pin 42 is located behind the beam 34. The coupling arm 41 has a supporting plate 45 on the top. Between the support 43 and the supporting plate 45 there is arranged a compression spring 46. The spring 46 is guided on a pin 47, which passes through an aperture in the support 43 and through a hole, in which it is a loose fit, in the supporting plate 45. The pin 47 is provided at the top with a nut 48 and at the bottom with a nut 49. The weight of the pin 47 keeps the nut 48 on the supporting plate 43, and the nut 49 hangs below the plate 45. Between the supporting plate 45 and the pin 42 the coupling arm 41 carries an indicating arm 50, which extends upwardly transversely of the length of the arm 41. The top of the indicator arm 50 is movable along a scale 51, which is fixed to the frame beam 34.

When the spreader is lifted from the ground by the lifting device in operation, the weight of the spreader and of any material contained in the hopper will exert on the coupling arm 41 a force which tends to turn this arm about the pin 42 in the relative direction of the arrow 52. This turn is opposed by the compression spring 46, which exerts a force on the coupling arm 41 tending to turn the coupling arm 41 about the pin 42 opposite the direction of the arrow 52. The spring 46 is compressed to a greater or lesser extent, depending on the weight of the spreader and any material contained in the hopper 5, so that the position of the coupling arm 41 about the shaft 42 with respect to the beam 34 will differ to a greater or lesser extent from the positions shown in FIG. 4. The spring 46 is chosen so that when the hopper is empty, and hence the spring is only slightly compressed, the coupling arm 41 and hence the pointer 50 are turned about the shaft 42 to an extent such that the end of the pointer 50 is located near the end 53 of the scale 51. The scale 51 may have a zero mark at this end. When the hopper 5 is completely filled, the spring 46 is compressed. The arm 41 with the pointer will turn about the shaft 42 in the direction of the arrow 52. When the hopper is completely filled, the pointer 50 will be at the end 54 of the scale 51. As in the preceding embodiment the scale may have at this end a division 5. As in the first embodiment the scale thus provides an indication of the extent of emptying of the hopper after a given run so that it can be ascertained whether the dosing mechanism is correctly adjusted or whether it needs to be readjusted to spread the desired quantity of material per unit of distance covered, so that the desired quantity of material per unit surface is distributed. Thus the arm 41 with the spring 46 and the associated parts constitutes an indicating apparatus.

FIG. 5 shows an embodiment which is similar to that of FIG. 4, but the pointer 50 and the scale 51 are replaced by a connection with an indicator on for example, the tractor to which the spreader is attached. For this purpose, the pointer 50 is replaced by an indicator arm 56, the top end of which is coupled with the inner core 57 of a Bowden cable 58. The end of the outer sheath of the Bowden cable 58 is fastened to a support 59 arranged on the beam 34 of the frame 4. The movement of the supporting arm 41 about the shaft 42 is transferred through the arm 56 and the core 57 to an indicator on the tractor. In this way the tractor driver can easily observe the indications and so check the flow of material from the hopper. As in the preceding embodiment, he can then work out whether the dosing mechanism 7 needs to be readjusted or whether the desired quantity of material is actually being spread per unit time and/or per unit of distance covered. The nut 49 is positioned on the rod 47 so that it may form a stop for the position in which the hopper is completely empty. In this position the spring 46 extends to such an extent that the nut 49 comes into contact with the lower side of the supporting plate 45. The nut 49 can be adjusted to some extent so that, when the hopper 5 is empty, the pointer 50 is at the zero position 53 on the scale 51.

FIGS. 6 and 7 show an embodiment in which an indicating apparatus 65 is arranged between the frame 4 and the fastenting area at the lower arms 11 of the lifting means 2. The indicating apparatus 65 comprises a supporting arm 66, which is movable in a support 67 secured to the beam 34 of the frame 4. The supporting arm 66 is vertically displaceable in a sleeve 68 of the support 67. On the lower end, below the support 67, the supporting arm 66 is provided with a fastening member 69 having a pin 70, with which the lower arm 11 can be coupled. Between the support 68 and the fastening member 69, which can slide along the lower part of the supporting arm as far as a nut 71, and there is a compression spring 72. The upper rod 73 of the lifting means, as in the preceding embodiment, is fastened to the support 12 of the frame 4. It will be appreciated that the parts of the spreader shown in FIG. 6 which correspond with parts of FIG. 1, are designated by the same reference numerals. The supporting arm 66 is provided with a stop 74, above which the arm 66 has an extension 75 which is integral with the arm 66. The top end 76 of the extension 75 constitutes a pointer movable along a scale 77. The scale 77 is arranged on the top of the hopper 5. The extension 75 is formed so that the end 76 extends vertically to one side of the hopper 5.

When the spreader is put into use, it is supported above the ground by the lifting means and is located at the desired level above the ground to ensure a correct distribution. Under the action of the weight of the spreader and of any material contained in the hopper 5, the frame 4 with the support 67 tends to move downwards. However, this movement is opposed by the compression spring 72, which bears on the lower side of the support 67 and is in engagement with the top of the fastening member 69. The spring 72 is selected so that it is completely compressed, as shown in FIGS. 6 and 7, when the hopper 5 is full. In this state the top end of the pointer 76 is opposite the upper indication 78 of the scale 77, which indicates that the hopper is completely filled. During spreading of the material the laden weight of the spreader decreases so that the spring 72 extends and the support 67 and hence the whole spreader will be lifted by the spring 72 with respect to the coupling member 69 connected with the arm 11 of the lifting means of the tractor. When the hopper is completely empty, the spring 72 has extended so far that the frame 4 and hence the scale 77 have risen with respect to the supporting arm 66 and the pointer 76, the top end of the pointer 76 then being at the lowermost division 79 of the scale 77. The digit 79 indicates that the hopper is empty and the spring 72 only supports the weight of the spreader itself. The stop 74 is arranged so that when the hopper is empty the support 67 has moved upwardly with respect to the supporting arm 66 up to the stop 74.

In this embodiment, each of the two arms 11 is connected with the frame by means of a supporting arm 66, a spring 72, a support 67 and a coupling member 69. The supporting arm 66 on only one side of the spreader needs to be provided with the extension 75 with the pointer 76, and the scale 77 needs to be provided only on one side of the hopper 5. In the preceding embodiment, there is a support 43 with a spring 46 and a supporting arm 41 for each of the two lower arms 11 of the lifting device on each of two beams 34 located one on each side of the spreader. As in the embodiment shown in FIGS. 6 and 7 the embodiment shown in FIGS. 4 and 5 need have the scale 5, or the coupling member 56, only on one side. In the embodiment of FIGS. 6 and 7, the nut 71 constitutes a stop, which allows the distance between the stop 74 and the nut to be adjusted so that readjustment is possible, for example, for mounting the indicating apparatus comprising the arm 66 with the spring 72 and the pointer 76 with the scale 77.

FIG. 8 shows an embodiment corresponding generally with the embodiment shown in FIGS. 6 and 7. Corresponding parts are, therefore, denoted by the same reference numerals. In this embodiment, the supporting arm 66 is replaced by an arm 81 having a slightly greater length than the arm 66. An auxiliary spring 82 is arranged above the support 67, the lower end of which bears on sleeve 68 of support 67 and the upper end of which is in engagement with a stop 83, which is displaceable by means of a nut 84 along the arm 81. The embodiment shown in FIG. 8 operates in the same manner as the embodiment shown in FIGS. 6 and 7. The spring 82 provides, however, a given amount of counter-pressure opposing the movement of the spreader with the frame 4 with respect to the supporting arm 81 in the vertical direction. Therefore, when running over uneven ground, the spreader cannot unduly move upwardly with respect to the supporting arm 81. The pressure of the spring 82 can be adjusted to some extent by setting the stop 84 along the supporting arm 81. The tension of the spring 72 in this embodiment is set to overcome the force of the auxiliary spring 82 so that in this embodiment the spring 72 in the completely compressed state provides a greater force than in the preceding embodiment.

In the embodiment described above the indicating apparatus is constructed so that the spreader and any material contained in the hopper are, in effect, weighed by springs in the indicating apparatus. The indicating apparatus may, however, as an alternative be constructed in a manner in which essentially the weight of the spreader with the material in the hopper is also assessed to serve as an indication of the degree of filling of the hopper and of the delivery of material from the hopper during operation. FIG. 9 shows schematically the use of pressure produced via the arms 11 in the hydraulic system of the lifting means of a tractor in accordance with the weight of the spreader with any material contained in the hopper. The spreader 1 is supported on the lower arms 11 of the lifting means 2, which is held in the desired position by a hydraulic system 90. The hydraulic system includes an indicator 91 displaying the pressure prevailing in the hydraulic system under the action of the weight of the spreader 1 and any material in it. The indicator 91 has a scale displaying, for example, the quantity of material in the hopper in kilograms. In the indicator 91, the pressure prevailing in the hydraulic system 90 is converted into a movement of the pointer, which takes up a position in the scale in accordance with the magnitude of the pressure in the system 90, which depends upon how full the hopper 5 is. As in the preceding embodiments the indicator 91 provides data of the content of the hopper 5 and of the rate or emptying of the hopper per unit time or per distance covered. As in the preceding embodiments the dosing mechanism 7 may be readjusted or maintained in the selected position accordingly.

The dosing mechanism 7 may be adjusted, for example, manually in accordance with the data from the indicating apparatus, by means of a setting device 101 connected with the dosing mechanism. However, the data provided by the indicating apparatus may also be employed for automatic adjustment of the dosing mechanism. FIG. 10 illustrates schematically the transfer of data corresponding to the pressure in the cylinder 90 in the embodiment of FIG. 9 to a computer 92. The computer 92 can be programmed for various magnitudes to be combined with the data of the pressure in the hydraulic system 90, the output serving to control a dosing member 93, shown only schematically in FIG. 10. The dosing member 93 may be coupled to this end with an adjusting motor 94, which adjusts the dosing member in dependence upon instructions from the computer to increase or decrease the rate of flow of material from the hopper. By means of a knob 95 the computer can be programmed as to the desired quantity of material to be spread per unit area. The width of spreading of the material by the spreading member 6 can be set by means of a knob 96. The pressure data of the hydraulic system 90 can be entered through an input line 97, while the output can be transmitted through a line 99 to provide instructions to the motor 94 to adjust the dosing member 93. In this computer control with, for example, programmed parameters 95 and 96 relating to the desired quantity to be spread per unit area and to the spreading width of the spreading member, the indication of the pressure varying with the delivery of material from the hopper and with a variable travelling speed will cause adjustment of the dosing member, for example, to a higher travelling speed or to a decrease in travelling speed. With a regulated adjustment of the apparatus, the tractor driver need no longer pay accurate attention to the travelling speed in order to keep it as constant as possible to ensure optimum distribution of the material on a field. The computer 92 may be such that the area, in hectares, that has been covered by the divice is displayed on a dial.

FIG. 11 shows a simpler embodiment of a computer 105 having a setting knob 106 for entering the spreading width, and an input 107 coupled with the speedometer of the tractor or the like, to which the spreader is attached. The combination of the magnitudes of the spreading width and the travelling speed provide an indication in the window 108 of the surface in hectares which has been covered.

FIG. 12 shows a further embodiment of a spreader. In this embodiment the spreader is a liquid spreader, for example, for distributing a liquid for phytopathological control. The container of the spreader 111 is a tank arranged on a frame 113. The frame 113 is provided at the front with a coupling member 114, which can be hitched to the mounting bar 115 of a tractor 116. The frame 113 is provided with ground wheels 117, which are arranged on supporting arms 118 arranged for movement with respect to the frame 113. The frame portion comprising the ground wheels 117 and the supporting arms 118 may be equipped, for example, with a hydraulic mechanism 119 as shown schematically in FIG. 12. The pressure in the hydraulic system 119 varies as a function of the weight of the spreader and of the contents of the tank 112. This system includes an indicator 120, for example one corresponding with the indicator 91 of FIG. 9. When the tank 112 is completely filled the pressure in the hydraulic system 119 will be higher than it would be if the tank were empty. This can be displayed by the indicator. By means of a spreader as shown in FIG. 12, a liquid, such as a solution of insecticides, can be sprayed through one or more spraying nozzles 121. through which liquid is forced by a pump (not shown) As in the embodiment shown in FIG. 10, the data shown on the indicator 120 may be entered into a computer 122 (FIG. 14). The computer 122 may be like the computer 92 so it will not be described again. An adjusting motor 123, comparable with the motor 94 of FIG. 10, may be connected with a dosing mechanism which determines the quantity of liquid sprayed by the spraying nozzles 121 per unit time or per unit of distance covered or both. The adjusting motor 123, for example, may be connected with the drive 125 of a gear wheel pump 124, which pumps the liquid from the tank towards the nozzles 121. By raising or lowering the speed of the gear wheel pump 124 by means of the adjusting motor 123, the quantity of liquid sprayed per unit time or per distance covered can be controlled.

FIG. 13 shows schematically an embodiment in which it is not the weight but the level of the material contained in the tank which provides data by means of an indicator about the contents of the tank and the delivery of material from the tank. The tank shown in FIG. 13 may be similar to that shown in FIG. 12. The tank 130 has a float 126 floating on the liquid contained in it. The float 126 is coupled with a pointer 127 moving along a scale 128. In accordance with the position of the float 126 on the liquid level 129 in the tank, the pointer 127 will occupy a particular position on the scale 128. The scale 128 and the pointer 127 thus provide data about the quantity of liquid contained in the tank. When the liquid is discharged, the variation of the liquid level displayed by the pointer 127 is indicative of the quantity of liquid per unit time or per unit of distance covered or both. As in the preceding embodiments of FIGS. 9 to 14, the data provided by the indicator 127 may be transferred to a computer in order to obtain an automatic control of the dosing mechanism regulating the quantity flowing from the hopper towards a spreading member such as a spraying nozzle. The indicating apparatus in the embodiment of FIGS. 1 to 8 may also be combined with a computer in order to ensure automatic adjustment of the dosing mechanism as described with reference to FIGS. 10 and 14.

Although various features of the spreader that have been described and are illustrated in the drawings, are set forth in the following claims as inventive features, it is to be noted that the invention is not necessarily limited to these features and may encompass further features that have been described both individually and in various combinations.

What we claim is:

1. Agricultural equipment for distributing material such as seed or fertilizer, the equipment comprising an upright supporting frame member means including a lower arm and a supporting arm pivotably connected thereto for coupling the equipment to the lifting device of a tractor or like vehicle, a container for material to be distributed which is supported at least in part by said frame member and said lower arm, a discharge member for receiving said material from said container, and an apparatus continuously providing data related to the quantity of material delivered from said container to said discharge member, said apparatus being arranged in said supporting arm connecting the equipment to said tractor or like vehicle and comprising a pivotable connection between said frame member and said supporting arm, resilient means interconnecting said frame member and said supporting arm, and indicia means which in part is interconnected to said frame member and in part to said supporting arm, the coaction of said parts providing said data at least in part.

2. Equipment as claimed in claim 1, in which said lower arm is one of two lower arms which are connected respectively with the ends of said supporting arm and a further like supporting arm movably connected to said frame member.

3. Equipment as claimed in claim 1, in which said resilient means comprises a spring is arranged between said supporting arm and said frame.

4. Equipment as claimed in claim 3, in which said spring is a compression spring.

5. Equipment as claimed in claim 4, in which said compression spring surrounds a pin, said pin being movable with respect to said supporting arm.

6. A system for indicating the amount of material in a container for an agricultural device for spreading fertilizer or seed when the container is mounted on the lifting device of a tractor, the system comprising a supporting structure for said container located between said container and said tractor, resilient means in said supporting structure whereby said resilient means bears at least a portion of the weight of said container and material therein, an indicator means connected and responsive to said resilient means which performs the function of indicating the weight of material in said container to the operator of said tractor, said indicator means including a part interconnected with said container and a further part interconnected with said tractor through said supporting structure whereby said parts coact for performing said function of indicating the weight of material in said container.

7. Agricultural equipment for distributing material such as seed or fertilizer, the equipment comprising a frame, means including a lower arm for coupling the equipment to the lifting device of a tractor or like vehicle, a container for material to be distributed, a discharge member for receiving said material from said container, and an apparatus continuously providing data related to the quantity of material delivered from said container to said discharge member, said apparatus being arranged in said lower arm connecting the equipment to said tractor or like vehicle, said lower arm being pivotably connected by connection means with a supporting arm movably connected to said frame, said connection means including resilient means and indicia means which is in part interconnected to said frame and in part to said lower arm, said parts coacting to provide said data at least in part.

8. A system for indicating the amount of material in a container for an agricultural device for spreading fertilizer or seed when the device is mounted on the lifting device of a tractor, the system comprising a supporting structure for said container located between said container and said tractor, said supporting structure comprising a frame for said container, supporting arms between said frame and the lifting device, said supporting arms including resilient means which performs the function of indicating the decreased weight of material in said container to the operator of the tractor which is caused by spreading the fertilizer or seed.

* * * * *